United States Patent [19]

Pütz

[11] Patent Number: 4,834,546

[45] Date of Patent: May 30, 1989

[54] PROCESS FOR MIXING BATCHES OF A FLUID MEDIUM AND APPARATUS THEREFOR

[75] Inventor: Joachim E. Pütz, Frankfurt am Main, Fed. Rep. of Germany

[73] Assignee: Edeleanu Gesellschaft mbH, Frankfurt, Fed. Rep. of Germany

[21] Appl. No.: 44,188

[22] Filed: Apr. 30, 1987

[30] Foreign Application Priority Data

May 10, 1986 [DE] Fed. Rep. of Germany ....... 3615859

[51] Int. Cl.[4] ....................... B01F 15/02; B01F 15/04; G01G 13/02; G01G 17/06

[52] U.S. Cl. ....................................... 366/141; 222/77; 366/152; 366/177

[58] Field of Search ................. 366/141, 152, 162, 18, 366/151, 153, 160, 150, 177, 348, 8; 137/87, 98, 101.25; 222/77; 141/231, 232, 233, 104, 284; 198/463.3, 362; 177/116, 245, 1, 52, 145, 62

[56] References Cited

U.S. PATENT DOCUMENTS

| | | | |
|---|---|---|---|
| 2,527,147 | 10/1950 | Noble | 222/77 X |
| 2,750,144 | 6/1956 | Beckwith | 177/1 |
| 4,191,885 | 3/1980 | Rodriguez et al. | 177/1 X |
| 4,320,775 | 3/1982 | Stirling et al. | 137/98 X |
| 4,362,033 | 12/1982 | Young | 366/153 X |
| 4,523,854 | 6/1985 | Beckley | 366/153 X |
| 4,525,071 | 6/1985 | Horowitz et al. | 366/152 |

*Primary Examiner*—Harvey C. Hornsby
*Assistant Examiner*—Scott J. Haugland
*Attorney, Agent, or Firm*—Robert B. Burns; Robert A. Kulason; Thomas H. Whaley

[57] ABSTRACT

The invention is directed to a method of and a system for mixing batches of a flowable medium, especially of hydrocarbons used as base materials for said media and of additives to be admixed thereto. In the mixing operation, the base materials and optionally additives are weighed in a primary weighing section capable of holding a complete batch to form the base medium. Independently thereof, additives, amounting to minor fractions of the batch, are weighed out in at least one precision weighing section. The weighed-out additive fractions are then admixed to the weighed-out base medium.

1 Claim, 1 Drawing Sheet

PROCESS FOR MIXING BATCHES OF A FLUID MEDIUM AND APPARATUS THEREFOR

BACKGROUND OF THE INVENTION

The invention is directed to a method for mixing or blending batches of a flowable medium, especially hydrocarbons used as base materials for said media, and additives to be admixed thereto, and to a system for performing said method.

In the following description, the term batch or batches refers to the product which results from the bulk mixing or blending of solid or liquid ingredients in large amounts. It relates more particularly to a batch of a flowable medium such as base oil in an amount up to about 15 tons. In contrast, the additive materials which are mixed into the base oil, could be in an order of magnitude of several hundred grams.

Fully automatic mixing systems for oils, and additives to be admixed thereto are known. Such mixing systems normally comprise a weighing arrangement whose tanks are capable of holding a complete batch. Usually, the oils and additives are progressively weighed into this weighing tank. Admixing of minor additive quantities in the order of fractions of the complete batch is effected in a rather unprecise or crude manner.

For example, weighing arrangements of this type weigh out up to 50 tons of the bulk medium. The additional weighing of fractional or relatively minute amounts of modifier materials into the bulk medium, for example 200 grams of an additive, can be effected with little or no accuracy on a weight basis.

It is also known to use weighing arrangements to form blended lubricating liquids, utilizing a tank capacity of 800 to 1000 kg. It is true that these weighing arrangements are capable of weighing in desired amounts of the bulk material in a preliminary batch. It is difficult, however, to weight out with any degree of accuracy, batch fractions in the order of 200 grams of the components to be admixed into the preliminary batch.

Known bulk weighing arrangements having weighing tanks having 800 to 1000 kg capacity can be adapted to be mobile. The weighing tanks are thus capable of being moved to a tank truck or bulk storage tank. Alternatively, the tank's contents are transferred to larger storage or transport tanks. These operations are repeated until a sufficient quantity of finished blend has been produced.

It is an object of the invention herein disclosed, to provide a method of, and an arrangement for weighing out a preliminary batch of a base liquid media, which will be provided with a minor amount of additive material, the latter being blended into the base material in precisely weighed proportions.

The above-specified objective is achieved through use of an apparatus comprising a primary weighing section capable of holding a complete batch. The base material, and optionally certain additives, are weighed in to comprise a preliminary batch of the base medium. Independently, further additives amounting to minor fractions by weight of the overall batch, are formed in at least one precision weighing section. The precisely weighed-out additive fractions are then admixed into the bulky, weighed-out base medium.

In a primary weighing tank of the primary weighing section the major batch proportions, above all the base materials, are weighed out. This primary weighing section is capable of achieving a coarse weighing operation, which capability is sufficiently adequate for the large proportions of the base medium. In the precision weighing section of the system, precision weighing and forming of the fractional amount of additive material is then accomplished.

Following weighing-out a forming of the minor fractional amount of additives, the latter are introduced into the base medium where, however, only the total is weighed out. A signal, or other weight monitoring means, which can include a computer or the like, can be utilized for regulating or monitoring the flow of both the bulk material and the one or more additive fractions.

A system for performing the described method is characterized by a primary weighing section including a primary weighing tank for a complete batch, and at least one and preferably a plurality of precision weighing sections. The latter includes a precision weighing tank for holding additive quantities which are to be blended into the preliminary batch. The precision weighing tank for the additive quantities is adapted to be physically transferred or transported to the primary weighing tank. Liquid transfer means is provided for establishing temporary liquid transfer communication between the precision weighing tank for the additive quantities, and the primary weighing tank for the complete batch.

In accordance with a further embodiment of the invention the precision weighing portion of the arrangement is calibrated with numerical increments of about 10 to 20 grams, the maximum load of this segment being about 5 to 200 kg. Such precise metering increments are deemed adequate to provide accurate minor amounts of the additive material.

To physically transfer the precision weighing tank to the primary weighing tank, a further feature of the invention resides in a transfer system which is cooperative with the precision weighing tank for additive quantities. Said precision weighing tank is thus movable along a fixed transfer line by means of a carriage or dolly or the like.

The precision weighing tanks are characterized by a smaller width of access opening than the openings in the primary weighing tanks. As a consequence, the number of inlet valves for additives is limited in the instance of the precision weighing tanks. Since, however, a number of different additives must be weighed out and processed, plural precision weighing sections including precision weighing tanks are preferred.

In accordance with a further embodiment of the invention, when a plurality of precision weighing sections for additive quantities are utilized, the transfer line will extend between spaced apart rows of the bulk and precision weighing tank positions.

To enable and facilitate the simultaneous preparation of several batches a further embodiment of the invention provides that plural primary weighing sections are disposed in parallel to the transfer line. This arrangement facilitates transfer of the precision weighing tanks to the primary weighing tanks by means of a track or rail mounted carriage.

In accordance with a further aspect of the invention there is provided a tank elevating mechanism for raising tanks which holds additive materials up to a level exceeding the primary tank. It is also desirable to provide the elevating means with additional mixing means. It is further desirable to provide parking locations adjacent to the transfer line, where the respective additive tanks can be positioned.

Finally, it is provided that the primary weighing sections have a maximum load of about 15 tons. This maximum load design offers the advantage that the discrete, mixed batches will be comparable with the capacity of tank trucks which can then be loaded with either one batch or two batches.

Stated otherwise, there is hereinafter disclosed a system for forming or blending a batch of a flowable medium comprised of a major amount by weight of a hydrocarbon material, and a precise, or accurately weighed, minor amount of at least one additive material. The system includes a primary tank means for holding the major or bulk amount by weigh of the hydrocarbon material. At least one secondary tank, and preferably a plurality of secondary tanks are detachably communicable with a source or separate sources of additive materials.

Precise or accurate weighing means-engageable with the at least one secondary tank, is operable to furnish a precise or fine indication of the weight of additive material, which is metered into said secondary tank, from a source of said material.

A transfer line extending between the primary tank and said plurality of secondary tanks includes guide means such as a set of tracks, rails or the like. A carriage which operably engages the track, functions to conveniently transport additive holding tanks.

Thus, a precisely weighed amount of additive material contained in at least one secondary tank can be conveyed along said transfer line to said primary tank. The precise amount of additive materials can then be blended into the major or bulk amount by weight of the hydrocarbon in said primary tank.

The invention will be explained in detail with reference to the drawing, in which.

Figure 1:
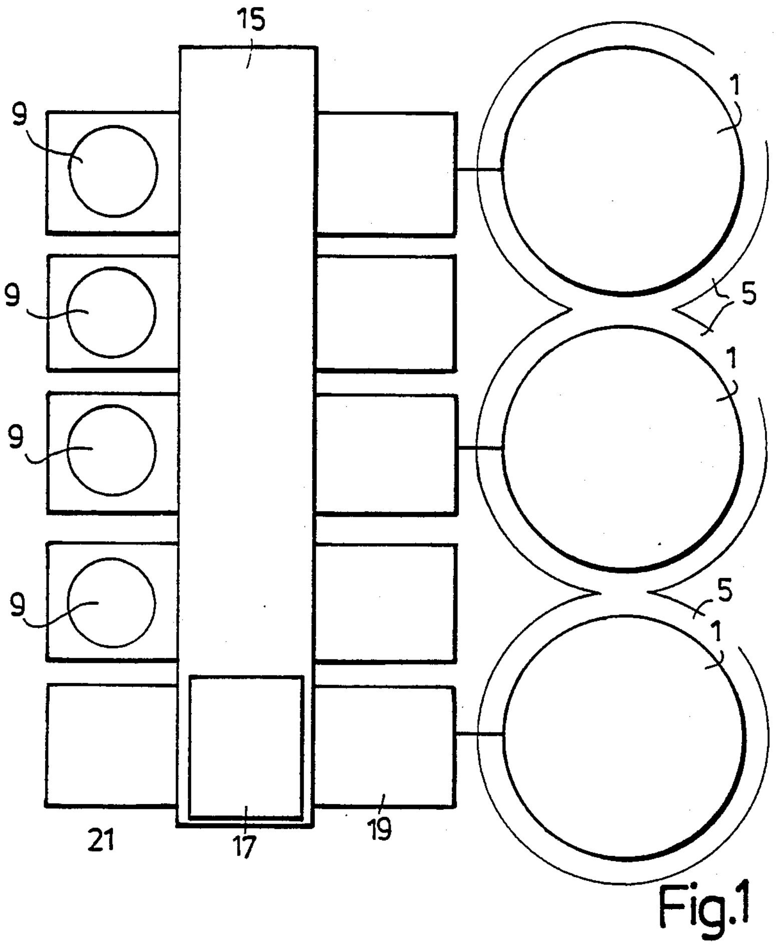
FIG. 1 is a plan view of a system for performing primary weighing and precision weighing operations to prepare a weighed-out mixture of a base medium and additives admixed thereto in precisely metered quantities.
Figure 2:
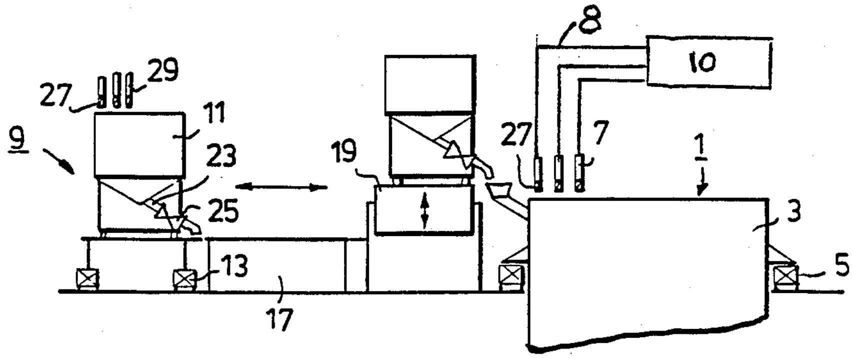
FIG. 2 is a quasi-schematic side view of the system of FIG. 1.

In FIG. 1 three primary weighing sections 1, 1′ and 1″ are illustrated aligned in a row in side-by-side relationship. As will be apparent from FIG. 2, each primary weighing section, such as 1, comprises a primary weighing tank 3 and a primary balance or weighing device 5.

The primary weighing tanks 3 may have a capacity of 15 tons. Proportions of a medium to be mixed, for example a hydrocarbon serving as base material, can be introduced into these primary weighing tanks from a number of storage tanks (not illustrated), via connecting lines 8 and communicated with a source 10, and discharge valves 7.

The primary balance 5 is capable of rough or coarse weighing, being calibrated in incremental steps of about 100 grams. Metering with such coarse incremental quantities is acceptable for large quantities or proportions. It is appreciated, however, that coarse metering increments of this type are entirely inadequate for determining minor quantities of the additives which are to be admixed as minor fractions of a complete batch.

For the precise weighing-out of small additive quantities, four precision weighing sections 9, 9′, 9″ and 9‴, are provided. These precision weighing sections are also preferably disposed in series or rows. The rows of both weighing sections 1, 1′ and 1″, and 9, 9′, 9″ and 9‴, extend in parallel relationship. The precision weighing sections 9 in their turn, comprise precision weighing tanks 11 which are associated with precision balances 13 or weighing means. The precision weighing sections 9 are designed for weighing additive amounts of about 5 to 200 kg. Precision balance 13 is thus capable of weighing out materials in numerical increments of from about 10 to 20 grams.

A transfer line 15 which can include a set of tracks or rails 16, is provided between adjacent rows of weighing sections 1 and 9. A carriage or dolly 17 is operably mounted to the track or rail 16, and is movable along said transfer line 15.

Elevating mechanisms 19 are disposed intermediate transfer line 15 and each primary weighing section 1. The elevating mechanisms while not presently shown in detail, can be combined with mixing means which reach into the tanks. In a further feature, parking locations or positions 21 are provided on either side of the transfer line 15 to accommodate the various weighing tanks.

Each individual precision weighing tank 9 is provided with liquid transfer means 23 including a flow control valve 25 mounted therein. All weighing results registered on the primary balances 5 and precision balances 13, are electrically detected and communicated as noted herein, to a computer or like data holding apparatus. Likewise, inlet valves 27 provided in the inlets 7 and in corresponding inlets 29 above the precision weighing tanks 11, are electrically actuated in response to the computer program.

Concurrently with the opening of the tank discharge cocks or valves, the respective tank walls can be electrically heated to reduce the viscosity, and thus facilitate rapid discharge of contained liquid.

The preparation of a complete batch of a predetermined medium, which is formed of base materials and a number of additives in minor quantities, is effected as follows. Only one primary weighing section 1 is utilized to illustrate the method.

Individual components of the batch to be prepared, are successively weighed as prescribed by the programmed computer and deposited into said primary weighing section. This is achieved by opening individual valves 27 which are communicated to a main source of the bulk material at 10.

At the same time, minor quantities of additives are metered into one or several precision weighing sections 9, 9′, 9″, and 9‴. When the weighing-in operation is completed for one precision weighing tank, 9 for example, the latter is moved or transferred by means of carriage 17, to elevating mechanism 19 at the primary weighing section.

Tank 11 is now elevated to a level at which the precisely weighed contents thereof can be fed or introduced into the primary weighing tank 3. This is achieved by opening valve 25.

Prior to said additive introduction, however, the content of the precision weighing tank 11 may have to be more thoroughly mixed by mixing means (not illustrated), associated with elevating mechanism 19. When additive quantities were concurrently weighed out in another precision weighing tank 11 for the same or a different batch, the precision weighing tanks can be shifted and exchanged after the first precision weighing tank 11 has been discharged into the primary weighing tank 5.

Subsequent to feeding of all additives into the primary weighing tank 3 and after thorough mixing of the content thereof, the batch is complete and ready to be pumped into a tank truck, a storage tank, or other bulk liquid container.

The entire operation or procedure, including moving of the individual precision weighing tanks 11 as well as the operation of the respective valves and the weighing operations, is performed fully automatically through programmed control of the system's computer.

It is understood that although modifications and variations of the invention can be made without departing from the spirit and scope thereof, only such limitations should be imposed as are indicated in the appended claims.

I claim:

1. A system for forming a quantity of a flowable material comprised of a major or bulk amount by weight of a hydrocarbon liquid, intermixed with a precise amount by weight of at least one additive material which system includes:

a plurality of primary tank means for holding said major amount by weight of the hydrocarbon liquid, each of said primary tank means including a weighing means connected to each of said plurality of primary tank means for weighing bulk material in each primary tank means, each of said plurality of primary tank means including a weighting means associated therewith for weighing bulk material in the primary tank means with which it is associated, a plurality of sources containing additive materials to be intermixed with said major amount of hydrocarbon liquid, at least one secondary, tank means detachably and selectively communicable with each of said plurality of sources of additive material, to receive a deposit of additive material from the latter, precise weighing means at each of said at least one source of additive material, being operable to furnish a precise indication of the weight of additive material which is deposited into said at least one secondary tank from each of said plurality of sources of additive materials, a track positioned intermediate the respective plurality of primary tanks and the plurality of additive material containing sources, said at least one secondary tank including a carriage operably mounted onto said track and supportably holding a secondary tank for receiving precisely measured amounts of additive materials, and an elevating mechanism positioned at said at least one primary tank and being operable to engage and to elevate the mobile tank to a sufficient height relative to a primary tank to allow a gravity flow of additive material from said mobile tank into the hydrocarbon liquid held in the primary tank.

* * * * *